(12) United States Patent
Foster

(10) Patent No.: US 6,786,191 B2
(45) Date of Patent: Sep. 7, 2004

(54) ENGINE CYLINDER DEACTIVATION TO IMPROVE VEHICLE INTERIOR HEATING AND DEFROSTING

(75) Inventor: Michael Ralph Foster, Columbiaville, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/304,029

(22) Filed: Nov. 25, 2002

(65) Prior Publication Data

US 2003/0101961 A1 Jun. 5, 2003

Related U.S. Application Data

(60) Provisional application No. 60/334,507, filed on Nov. 30, 2001.

(51) Int. Cl.[7] ................................................ F02B 77/00
(52) U.S. Cl. .................................................. 123/198 F
(58) Field of Search ............................ 123/198 F, 481, 123/41.44, 41.1, 41.08, 41.09, 41.02, 41.51, 41.74

(56) References Cited

U.S. PATENT DOCUMENTS

| | | | |
|---|---|---|---|
| 4,436,060 A | * | 3/1984 | Tanaka et al. ............. 123/41.1 |
| 4,655,187 A | * | 4/1987 | Gravestock ................. 123/481 |
| 5,787,855 A | * | 8/1998 | Mueller et al. .......... 123/198 F |
| 5,813,383 A | | 9/1998 | Cummings |
| 5,868,116 A | * | 2/1999 | Betts et al. ................. 123/481 |
| 6,023,929 A | | 2/2000 | Ma |
| 6,415,601 B1 | | 7/2002 | Glugla et al. |
| 6,499,293 B1 | * | 12/2002 | Surnilla et al. ............... 60/285 |
| 6,588,394 B2 | * | 7/2003 | Zheng .................... 123/198 F |
| 6,619,258 B2 | | 9/2003 | McKay et al. |
| 6,662,761 B1 | * | 12/2003 | Melchior ................. 123/41.44 |

OTHER PUBLICATIONS

SAE Paper No. 984014 "Reduced Fuel Consumption And Emissions Through Cylinder Deactivation" by M.H. Sandford et al.

Clean Diesel Engine III Program Variable Valve Timing Final Progress Report Year 1, SWRI Project No. 03–03271.

* cited by examiner

Primary Examiner—Tony M. Argenbright
Assistant Examiner—Hyder Ali
(74) Attorney, Agent, or Firm—Jimmy L. Funke

(57) ABSTRACT

The present invention employs cylinder deactivation hardware and control systems to increase the heat rejected to the engine cooling system to improve heating of an internal combustion engine and a passenger compartment of a vehicle. The heat rejected to the cooling system is a result of an increase in combustion temperatures in the non-deactivated cylinders, due to increased work. The invention also includes a system to reduce the cooling system heat capacity. The invention provides heat quickly after a cold start and while operating at low engine operating points. This method and system are particularly suited to compression-ignition engines and direct-injection spark ignition engines that primarily operate lean of stoichiometry.

9 Claims, 3 Drawing Sheets

ENGINE CYLINDER DEACTIVATION TO IMPROVE VEHICLE INTERIOR HEATING AND DEFROSTING

INCORPORATION BY REFERENCE

Applicant incorporates by reference herein provisional Patent Application No. 60/334,507, which was filed in the U.S. Patent and Trademark Office on Nov. 30, 2001, and was entitled "Engine Cylinder Deactivation to Improve the Performance of Exhaust Emission Control Systems".

Applicant also incorporates by reference herein patent application Ser. No. 10/304,119, which was filed on Nov. 25, 2002 in the U.S. Patent and Trademark Office and is entitled "Engine Cylinder Deactivation to Improve the Performance of Exhaust Emission Control Systems".

TECHNICAL FIELD

This invention pertains generally to internal combustion engine control systems, and more specifically to engine valvetrain mechanisms and cooling systems.

BACKGROUND OF THE INVENTION

Internal combustion engines, including compression ignition engines and spark ignition engines regularly undergo redesign efforts to improve efficiency and enhance fuel economy. Compression-ignition engines and direct-injection spark-ignition engines are gaining in popularity due in part to improved fuel economy, which may exceed 20% improvement compared to a similarly-sized, conventional spark-ignition engine. Compression-ignition engines and direct-injection spark-ignition engines operate with excess air in the combustion process, which is also referred to as operating lean of stoichiometry. An engine that operates lean of stoichiometry does so without a throttle valve in the air intake manifold. Stoichiometry is an air/fuel ratio at which there is a sufficient amount of oxygen from the air mixed with the fuel to completely oxidize the fuel during combustion. When air freely flows into the cylinders on an intake stroke of a combustion cycle, less pumping energy is required, leading to a fuel economy benefit. Engines that operate lean of stoichiometry are classified as heavy-duty diesel, light-duty diesel, and direct-injection gasoline engines.

The induction of excess air helps improve engine efficiency and vehicle fuel economy, but also reduces the quantity of heat energy that is created and transferred from a combustion chamber to the engine block and engine cooling system during combustion. When there is less amount of heat generated by the engine, there is less heat transferred to the engine cooling system. In addition, the excess air cools the engine, especially during low speed, low power operation. The engine cooling system uses a heat exchanger to transfer heat from the engine to the passenger compartment of the vehicle. The cooling system is designed to handle engine heat rejection from combustion that is created when the engine is operating at high speed, high power conditions in high ambient temperatures. A typical dynamic operating range for a compression-ignition engine is from 0 kW to 225 kW for a 6.6 liter engine. A cooling system that is designed to remove rejected heat from the engine when it is operating at 225 kW will be over-designed for a more typical operation of 30 kW, such as when the vehicle is operating at a steady-state cruise. Operation of the engine at a more typical operating point near 30 kW may not provide sufficient heat rejection by the engine to the cooling system. In addition, the capacity of the cooling system affects the amount of time required to warm the engine and passenger compartment. This is based upon fundamental heat transfer characteristics of the system and the thermal capacity of the cooling system. When a request for heat in the passenger compartment is not met by heat transfer from the engine in a reasonable amount of time, a vehicle's occupants experience discomfort. The amount of time necessary to adequately defrost windows and windshields also increases, particularly with compression-ignition engines and direct-injection gasoline-fueled engines. Hence there is an ongoing concern to be able to rapidly transfer heat from the engine to the passenger compartment of a vehicle to provide for passenger comfort and visibility.

Manufacturers of spark ignition engines generally implement a cylinder deactivation system to broaden the dynamic operating range of a specific engine configuration, thus leading to improvements in engine efficiency and vehicle fuel economy. Cylinder deactivation is currently being implemented on throttled spark-ignition engines such as are commonly used in cars and light-duty trucks. These engines obtain a relatively large fuel economy benefit (8% to 25%) from use of cylinder deactivation when operating at low engine operating points. This benefit is primarily a result of reduced engine pumping losses during operation of the cylinder deactivation system. Cylinder deactivation is currently not used on compression-ignition or direct-injection spark-ignition engines. There is little efficiency gain or fuel economy benefit for these engine configurations because they operate in an unthrottled mode with excess air. Therefore compression ignition or direct-injection spark-ignition engines generally have low pumping losses.

Pumping losses comprise the energy required to intake air through an intake system, pump it through the engine, and out of an exhaust system. Pumping losses reduce the total amount of energy that the engine translates into work. A typical multi-cylinder engine has an engine block with multiple cylinders, and a piston in each cylinder that is operably attached to a crankshaft. There is also at least one intake valve and at least one exhaust valve that allow passage of air into and out of each cylinder. A combustion chamber is formed inside each cylinder. The typical engine operates on a four-stroke combustion cycle that sequentially includes an air intake stroke, a compression stroke, a power stroke, and an exhaust stroke. During the air intake stroke the piston moves away from the intake and exhaust valves and creates a negative pressure in the combustion chamber. Pumping loss during air intake is due to the negative pressure in the combustion chamber that is working against the movement of the piston away from the intake and exhaust valves. During the exhaust stroke the piston moves toward the intake and exhaust valves and creates a positive pressure in the combustion chamber. Pumping loss during exhaust is due to the positive pressure in the combustion chamber that is working against the movement of the piston toward the intake and exhaust valves.

When a cylinder is active, the pumping loss during air intake is a measure of a restriction in the air intake system and includes air flow restrictions between the combustion chamber and the outside air, i.e. the intake valves, the intake manifold, any throttle device, and an air cleaning device. The pumping loss during exhaust is a measure of a restriction in the exhaust system and includes airflow restrictions between the combustion chamber and the outside air, i.e. the exhaust valves, the exhaust manifold, exhaust pipes, mufflers, resonators, and any exhaust aftertreatment devices, including catalytic converters. On engines employing an air throttle device, pumping losses are greatest during periods of low engine power usage. This is due to a large airflow restriction, and corresponding negative pressure, into the combustion chamber when the throttle device is only partially opened. Internal combustion engines and pumping loss measurement and description is well known to one skilled in the art.

When one or more cylinders is deactivated, there is a reduced demand in the intake system for incoming air. The reduced demand for incoming air results in less negative pressure being created in each combustion chamber during the intake stroke. On engines employing an air throttle device, the effect of the reduced demand for incoming air is more pronounced, in terms of the effect of the restriction on airflow. This results in less pumping loss through the engine, resulting in higher translation of energy into power, or work.

One form of a cylinder deactivation system operates by collapsing the opening mechanisms of the intake and exhaust valves of each deactivated cylinder, so the deactivated intake and exhaust valves all remain in closed positions. Fuel delivery is also discontinued to each deactivated cylinder. This action stops the flow of air and fuel to each deactivated cylinder. When cylinder deactivation occurs, an engine controller may also increase the amount of fuel delivered to the active cylinders, to meet the extant power demands of the engine and vehicle. This results in higher temperatures in each active cylinder. The active cylinders each operate with greater airflow, reducing pumping losses due to throttling of the air intake, and improving thermal efficiency.

To improve the warm-up and interior heating of a vehicle with a compression-ignition engine, the prior art has added a valve in the exhaust system to inhibit the flow of excess air on engine start-up. While this approach does inhibit the flow of air into the engine, and improve warm-up rate, it also increases the pumping losses of the engine, which serves to significantly negatively affect fuel economy. The prior art has also added electric space heaters to the passenger compartment, with related problems of packaging, durability, safety, and electrical energy consumption.

The prior art has also sought to increase engine-operating temperature by changing engine operation. The combustion temperature of a compression ignition engine is increased by restricting airflow to the engine using a throttle device. The combustion temperature is also increased by increasing engine exhaust gas re-circulation (EGR), changing timing of engine fuel injection to the cylinder, or changing timing of opening or closing of intake and exhaust valves. Each of these approaches may increase exhaust gas temperature, but may also result in decreases in engine performance and fuel economy, and increases in exhaust emissions.

Hence, there is a need to be able to improve the engine warm-up rate and passenger compartment heating without affecting fuel economy, or increasing exhaust emissions. There is also a need to minimize added hardware to the engine, and to use existing hardware on the vehicle. This need exists especially for engines that operate primarily at an air/fuel ratio that is lean of stoichiometry, such as compression ignition and direct-injection spark ignition engines. The need to improve engine warmup rate also exists for high-efficiency spark-ignition engines.

SUMMARY OF THE INVENTION

The present invention is an improvement over conventional systems for heating of an internal combustion engine and a passenger compartment of a vehicle, in that it is able to employ cylinder deactivation hardware and an engine control system to increase the heat rejected to the engine cooling system. This is intended for use in engines that primarily operate at air/fuel ratios that are lean of stoichiometry. The present invention also includes reducing cooling system heat capacity on all engine systems, including both stoichiometric and non-stoichiometric engines. The heat rejected to the cooling system is a result of an increase in combustion temperatures in the non-deactivated cylinders, due to increased work and a reduction in airflow through the engine. The reduction in cooling system heat capacity is a result of separating coolant fluid flowing through the engine such that the coolant fluid flowing to the passenger compartment heating system only flows through the engine past the activated cylinders. The addition of extra heat to the cooling system, combined with a reduction in effective volume of the cooling system act together to reduce the amount of time necessary for the engine cooling system to reach a sufficient temperature to provide useful heat to a vehicle interior after a cold start. This action provides heat quickly after a cold start and while operating at low engine power operating points. This method and system are particularly suited to engines that primarily operate at an air/fuel ratio that is lean of stoichiometry, i.e. compression-ignition engines and direct-injection spark ignition engines. The system monitors coolant temperature and engine operating point, and deactivates at least one cylinder based upon the coolant temperature and the engine operating point. The system also increases the amount of fuel delivered to each of the non-deactivated cylinders by an amount sufficient to maintain the operating point of the engine. The cylinder deactivation system preferably includes decoupling an opening mechanism of each intake and exhaust valve, and disabling fuel delivery to the deactivated cylinder(s). These and other objects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT OF THE INVENTION

Figure 1:
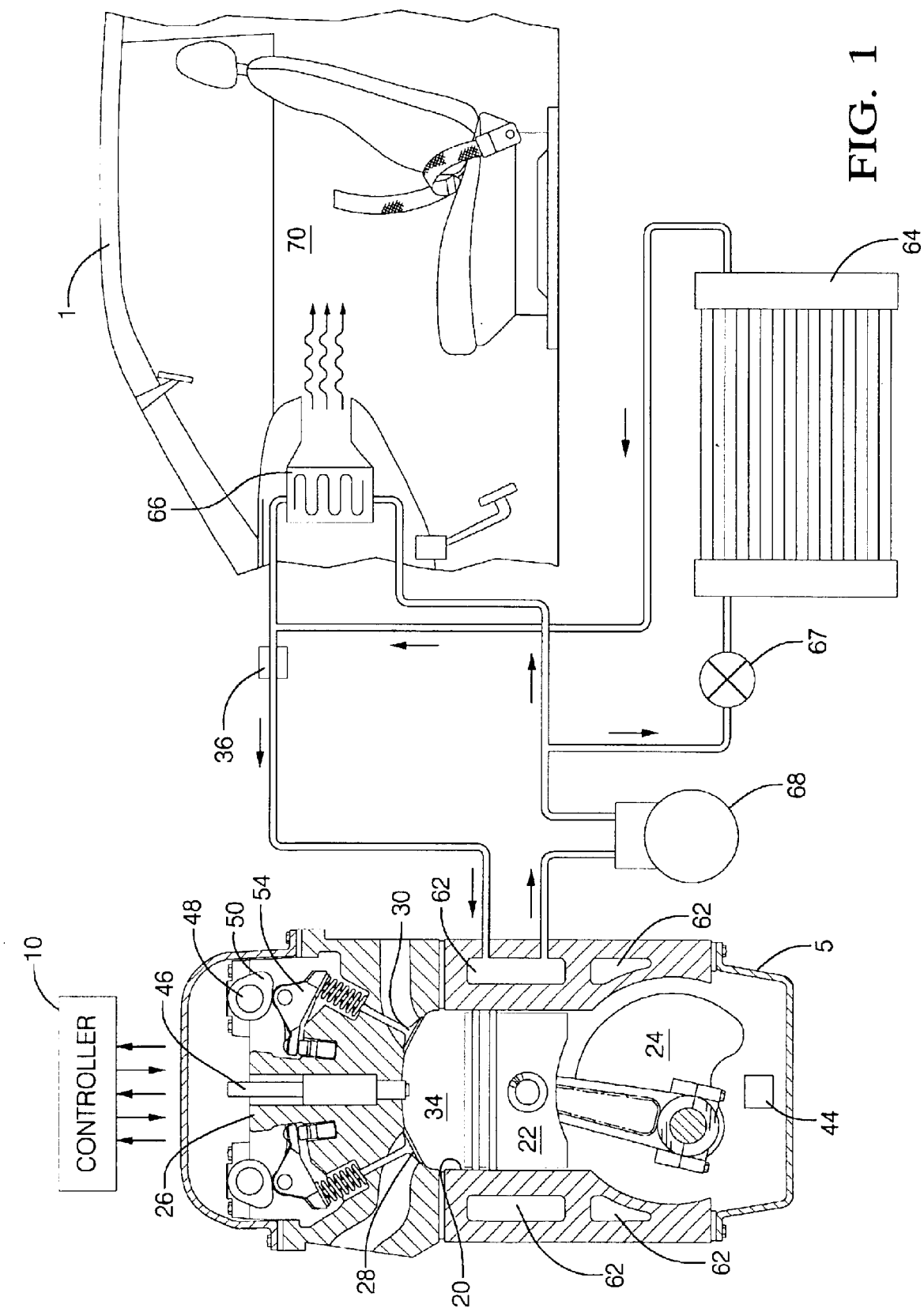
FIG. 1 is a schematic of an engine system in accordance with the present invention.

Referring now to the drawings, wherein the showings are for the purpose of illustrating the preferred embodiment of the invention only and not for the purpose of limiting the same, FIG. 1 shows an internal combustion engine 5, controller 10, and cooling system which have been constructed in accordance with an embodiment of the present invention. The invention comprises a system and a method for improving heating of a passenger compartment of a vehicle with an internal combustion engine 5 by deactivating at least one cylinder. In this embodiment, the internal combustion engine 5 is a compression ignition engine 5 that operates primarily lean of stoichiometry and is comprised of a plurality of cylinders. Each cylinder 20 contains a piston 22 that is operably attached to a crankshaft 24 at a point that is eccentric to an axis of rotation of the crankshaft 24. There is a head 26 at the top of the piston 22 containing at least one intake valve 28, at least one exhaust valve 30, and fuel injector 46. A combustion chamber 34 is formed within the cylinder 20 between the piston 22 and the head 26. A combustion charge is created in the combustion chamber 34 by an intake of air through the intake valve 28 when the valve 28 is opened, and an injection of fuel using the fuel injector 46. The combustion charge is ignited by force of compression caused by the movement of the piston 22 toward the head 26, according to predetermined conditions. The ignition of the air and fuel causes a rapid increase in pressure in the combustion chamber 34, which forces the piston 22 to move linearly along the length of the cylinder 20, away from the head 26. The movement of the piston 22 in turn causes the crankshaft 24 to rotate. The crankshaft 24 causes the piston 22 to again move toward the head after the crankshaft 24 has rotated to a furthest point of eccentricity. The operation of a compression-ignition internal combustion engine is well known to one skilled in the art.

Referring again to FIG. 1, the internal combustion engine 5 is configured with sensors that are operable to measure engine performance and demands for power, and output devices that are operable to control engine performance. The demands for power include demands from the operator, engine friction and pumping losses, and engine accessories, among others. The sensors preferably comprise a coolant temperature sensor 36, an engine speed sensor 44, accelerator pedal position sensor 32, and a vehicle speed sensor (not shown), among other sensors. The controller 10 is operably connected to each sensor such that it is able to collect information about engine performance and power demands. The design and implementation of engine sensors is known to one skilled in the art.

The output devices comprise a plurality of fuel injectors with an individual fuel injector 46 provided for each cylinder 20, and a cylinder deactivation system, among other output devices. The controller 10 is operable to individually control fuel delivery to each cylinder 20 using each fuel injector 46. Configuration of a fuel injection system is known to one skilled in the art. The controller 10 is also operable to control the cylinder deactivation system. The controller 10 collects information from the sensors to determine engine performance parameters and controls the output devices using control algorithms and calibrations that are internal to the controller 10. The controller 10 is operable to determine a an engine operating point based upon engine speed as determined by input from the engine speed sensor 44, operator power demand as determined by the input from the accelerator pedal position sensor 32, and fuel delivery to the engine 5. One skilled in the art is able to calibrate a controller 10 to determine an engine operating point based upon engine speed, accelerator position, and fuel delivery, and also able to control fuel delivery for a compression-ignition engine.

The cylinder deactivation system is preferably comprised of hardware mounted in the head 26 and control algorithms that are internal to the controller 10. The cylinder deactivation hardware includes a valve opening mechanism 54 for each valve 28, 30 of each cylinder 20 that is operable to be deactivated. The cylinder deactivation system also comprises a hydraulic subsystem (not shown) that preferably supplies pressurized oil from an engine oil pump (not shown) to each valve opening mechanism 54. There is also a solenoid valve (not shown) in the hydraulic subsystem that is operably connected to the controller 10 and is operable to control flow of oil to each valve opening mechanism 54 for each cylinder 20. The valve opening mechanism 54 is comprised of a lifter (not shown) and a locking pin mechanism (not shown) that is inserted between the camshaft 48 and each valve 28, 30.

The cylinder deactivation system is operable to disable each intake valve 28, each exhaust valve 30, and each fuel injector 46 for each cylinder 20 that is to be deactivated. In this embodiment, the cylinder deactivation system disables half of the cylinders when in the deactivation mode. For example, an eight-cylinder engine operates with four cylinders in deactivation mode, and a six-cylinder engine operates with three cylinders in deactivation mode. A typical valvetrain is comprised of the camshaft 48, and the plurality of valves 28, 30 that are normally closed and are spring-mounted in the head 26. A valve train is operable to open the plurality of exhaust valves 30, the plurality of intake valves 28, or both, depending upon the engine design. The camshaft 48 is a long rod that is mounted in the engine 5 and rotates around its longitudinal axis. It has cam lobes that correspond to each valve 28, 30 and that are typically cut into the camshaft 48 such that they are eccentric to the axis of rotation. Each lobe 50 has an eccentric portion and a portion that is concentric to the longitudinal axis, referred to as the cam base circle. Each lobe is in physical contact with a valve opening mechanism 54, which is comprised of a lifter and a locking pin mechanism. The valve opening mechanism 54 is in physical contact with each valve 28, 30. The rotation of the camshaft 48 causes each valve 28, 30 to open when the position of the camshaft is such that the eccentric portion of the lobe is in contact with the valve opening mechanism 54.

Under normal engine operation the camshaft 48 is rotating, opening each valve 28, 30 in accordance with the shape of the camshaft and the location of each lobe 50. The rotation of the camshaft 48 correlates to the rotation of the crankshaft 24. When the controller 10 commands the cylinder deactivation system to deactivate a specific cylinder, the system energizes the solenoid valve (not shown) that corresponds to the specific cylinder to be deactivated. The solenoid valve (not shown) opens, causing an increase in engine oil flow and oil pressure in a control port (not shown). When the control port is pressurized and the rotational orientation of the camshaft 48 is such that the valve opening mechanism 54 is adjacent to the base circle portion of the cam, the engine oil pressure acts on the locking pin mechanism (not shown) to disengage a locking pin (not shown). When the locking pin is disengaged, it decouples the camshaft 48 from the corresponding valves 28, 30. Therefore the valve opening mechanism 54 is disabled. In this embodiment, the valve opening mechanism is disabled for both the intake valve 28 and the exhaust valve for each cylinder 20 that is deactivated. The controller 10 also discontinues fuel flow to the deactivated cylinder, preferably by setting a pulsewidth signal to the injector 46 for the deactivated cylinder to zero during the period of time when deactivation is commanded by the controller 10. The cylinder 20 remains deactivated until the controller 10 commands the solenoid valve (not shown) to close, which leads to a decrease in engine oil pressure in the control port (not shown). When the engine oil pressure in the control port decreases, the locking pin (not shown) re-engages and re-couples the valve opening mechanism 54 of the camshaft 48 to the valves 28, 30. Mechanization and control of cylinder deactivation systems and corresponding valvetrain systems are known to those skilled in the art.

Referring again to FIG. 1, the internal combustion engine 5 also includes a cooling system that comprises coolant passages 62 throughout the engine that are fluidly connected to a radiator 64 and a passenger-compartment heating element 66. The coolant passages 62 are typically preferably located near cylinder walls or cylinder sleeves. Coolant fluid is circulated through the coolant passages 62 to absorb rejected heat energy from the combustion process. In a typical system, a pump 68 circulates the coolant fluid through the coolant passages 62 in the engine 5, past a thermostatic valve 67, and into the radiator 64 and passenger compartment heating element 66. Flow of coolant fluid is controlled by the thermostatic valve 67 to prevent coolant fluid from reaching the radiator 64 when coolant temperature is below a predetermined value (typically about 82° C.). This permits the engine 5 and coolant fluid to warm-up to an operating temperature range (typically 82° C. to 91° C.) more quickly and provide heated coolant fluid to the passenger compartment heating element 66 more rapidly. The cooling system is operable to conductively transfer heat energy from the walls of each cylinder 20 to the radiator 64 and passenger-compartment heating element 66, wherein the heat is expelled to the passenger compartment 70 or ambient air, by convective heat transfer. The cooling system also includes the coolant temperature sensor 36. The design of a cooling system for an internal combustion engine, including the passenger-compartment heating element 66, is known to one skilled in the art.

The invention comprises a system and a method for improving heating of the passenger compartment 70 of a vehicle 1. The vehicle 1 has an engine 5 with a cooling system that is thermally connected to the passenger compartment 70 using the passenger-compartment heating element 66, as described in reference to FIG. 1. The controller 10 monitors temperature of the coolant fluid, engine speed, and operating point of the internal combustion engine 5, as described previously in reference to FIG. 1. The operating point of the engine is an indication of power or torque output of the engine, and includes operator demand for power, parasitic loads on the engine (e.g. an electrical generator and a power steering pump), engine pumping losses, and other loads. In this embodiment the operator demand for power is determined by the accelerator pedal position sensor 32. In a typical cylinder deactivation system, the controller 10 may also monitor transmission gear and indices of engine integrity, such as presence of engine or vehicle malfunction codes, system voltage level, and engine oil pressure. The controller 10 then deactivates engine cylinders using the cylinder deactivation system. The controller 10 also preferably correspondingly increases fueling to each of the non-deactivated cylinders, to maintain the engine operating point. The deactivation of one or more cylinders increases an amount of rejected heat that is transferred from the engine to the coolant fluid, and therefore the heat that is transferred to the passenger compartment 70 of the vehicle 1. The effect of cylinder deactivation on coolant temperature and engine fueling is discussed with reference to FIG. 2.

There is a normal operating temperature range for coolant fluid in the engine 5, which is dependent upon the engine design and operating characteristics. For a compression-ignition engine, this range is typically 82° C. to 91° C., and is measured using the coolant temperature sensor 36. This range is predetermined, and is stored in the controller 10 as a calibration value. If the controller 10 determines that measured coolant temperature is within the normal operating temperature range, there is adequate heat rejected by the engine 5 to heat the passenger compartment 70. Therefore the cylinder deactivation system is not used in this instance for engine heating, although it may still be used to improve engine efficiency and fuel economy.

When the measured coolant temperature is below the normal operating temperature range, the controller 10 determines whether the engine operating point is sufficiently low to permit cylinder deactivation. Typically cylinder deactivation only occurs when the engine operating point is below fifty percent of the peak horsepower, on engines wherein the cylinder deactivation system disables half of the total cylinders when in the deactivation mode.

As stated previously in reference to FIG. 1, cylinder deactivation comprises disabling air flow and fuel flow to one or more cylinders using the cylinder deactivation hardware and control algorithms. The quantity of cylinders that are deactivated, and the selection of specific cylinders to deactivate, are specific to a given system, and based upon a determination of issues including engine dynamics and vibration. In this embodiment, a typical eight-cylinder engine in a V-engine configuration preferably disables non-opposing cylinders on each bank of the V-engine. A typical six-cylinder engine disables all three cylinders on a bank of the V-engine. Cylinder deactivation for improved heating of the passenger compartment 70 continues as long as the operating point of the engine remains below a predetermined level, and the coolant temperature is below the operating range of 82° C. to 91° C.

Referring now to FIG. 2, an output from an engine-modeling program is provided. The engine-modeling program is a program called GT-POWER, which is a commercially available computer-aided engineering and simulation tool from Gamma Technologies. It is designed for analysis of advanced engine and powertrain control systems. A six-cylinder compression-ignition engine with a turbocharger was modeled, wherein it was operated with all six cylinders functioning, and also with three of the six cylinders deactivated, as described previously.

Figure 2A:
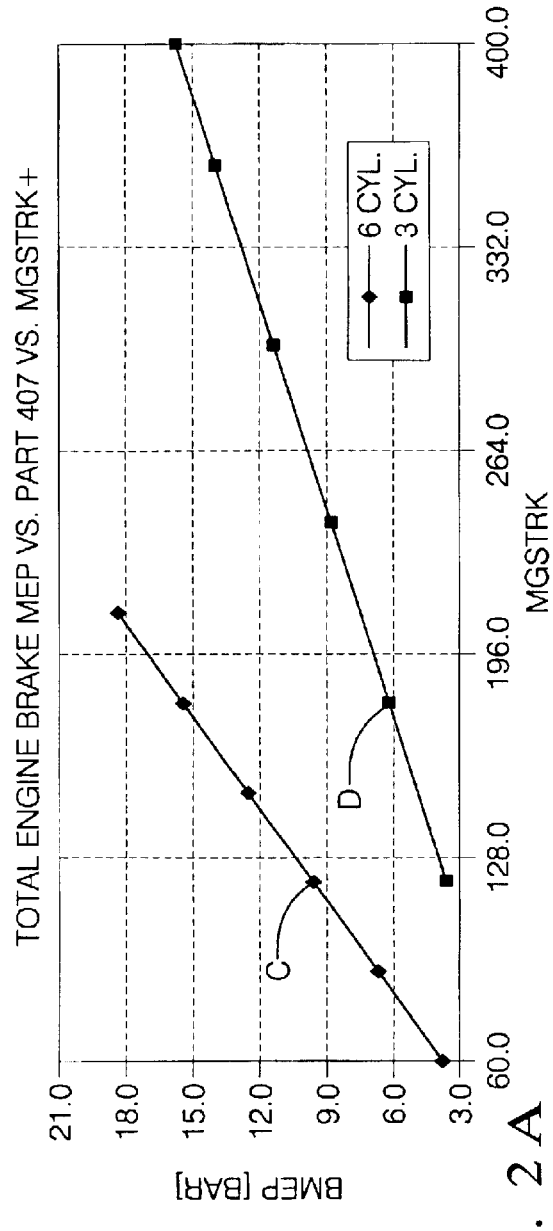
FIG. 2 is a graph, in accordance with the present invention.

Referring again to FIG. 2, data was generated using GT-POWER that shows engine power as a function of fuel flow to each cylinder, when the engine was operated at a specific speed, which was 1800 rpm ('revolutions per minute') for this example. FIG. 2A shows a graph of engine BMEP ('brake mean effective pressure') as a function of fuel delivery per injector stroke, which occurs once per cylinder event. Engine BMEP is a measure of an operating point of an engine. The graph shows BMEP as a function of fuel delivery for the engine when all 6 cylinders are active, and when only 3 of the 6 cylinders are active, with the engine operating under warmed up, steady-state conditions. The fuel delivery per injector stroke, which is the fuel delivery to each active cylinder, must approximately double for each cylinder event in order to maintain the same level of BMEP for the engine. For example, to maintain BMEP at 9 bar with all 6 cylinders operating (see item C), the fuel delivery system must deliver 120 mg. of fuel per injector stroke. However, to maintain BMEP at 9 bar with only 3 of 6 cylinders operating (see item D), the fuel delivery system must deliver 240 mg. of fuel per injector stroke. Therefore the need to maintain the operating point of the engine leads to an increase in an amount of fuel delivered to each cylinder, for each cylinder event.

Figure 2B:
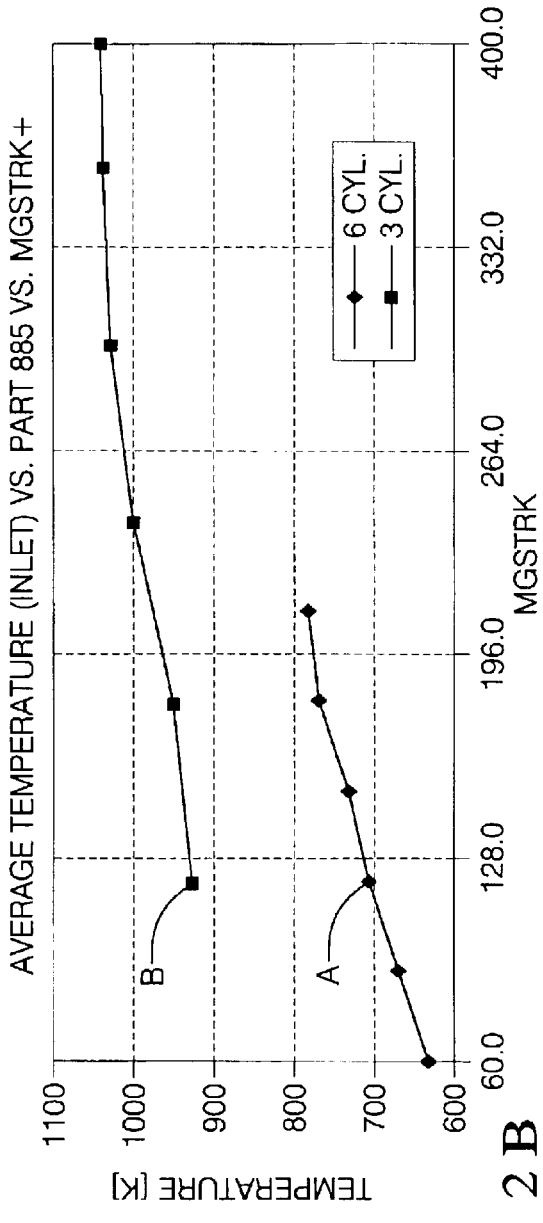

Referring now to FIG. 2B, data was generated using GT-POWER showing exhaust temperature as measured at an output of the turbocharger, as a function of fuel flow, when the engine was operated at a specific speed, which was 1800 rpm for this example. As stated with reference to FIG. 2A, to obtain the same power output (BMEP) from the engine, the total fuel flow into the engine must be the same. Item A of the line representing operation with 3 active cylinders is operating at the same operating point as item B on the line representing operation with 6 active cylinders, based upon total fuel flow to the engine. The exhaust temperature for item A is approximately 920 K, or 647° C. with 3 active cylinders, whereas the exhaust temperature measured for item B is approximately 600 K, or 327° C., with 6 active cylinders. These results demonstrate that there is a difference in exhaust gas temperature of 320° C. when operating the same engine with three active cylinders instead of all six cylinders. This difference in exhaust gas temperature reflects a significant increase in combustion temperature and heat. The heat rejected by the engine during combustion able to be transferred through the cylinder walls to the coolant passages and the coolant fluid, and finally to the passenger compartment heater.

Figure 3:
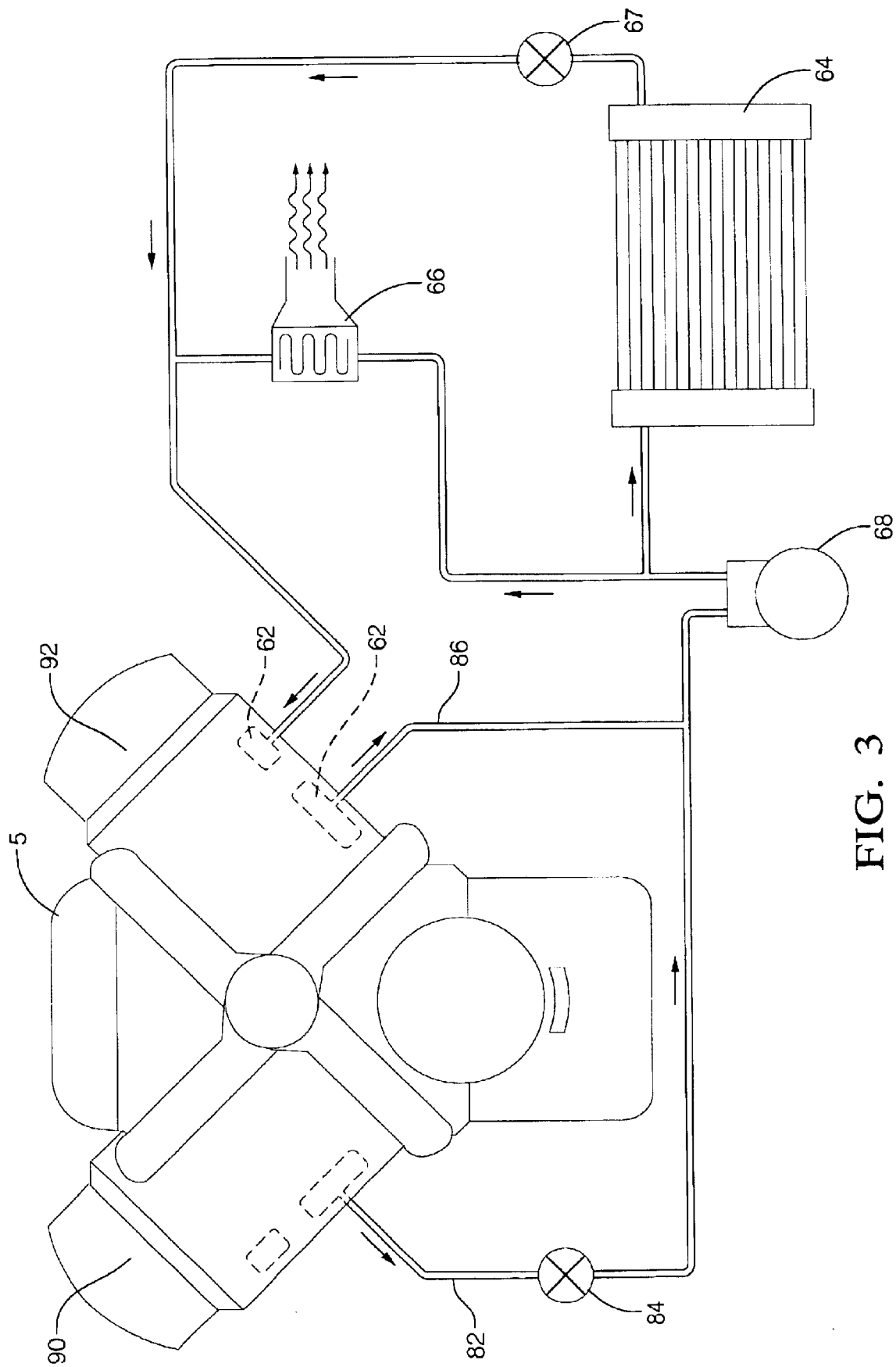
FIG. 3 is a schematic of an engine system in accordance with the present invention.

Referring now to FIG. 3, the cooling system is mechanized to separate coolant flow to reduce effective heat-carrying capacity of the cooling system. The cooling system is modified to enable flow of coolant fluid that flows predominantly passed the non-deactivated cylinders to the passenger-compartment heating element 66 when cylinder deactivation is occurring. The engine 5 is in a V-configuration with a first bank of cylinders 90 and a second bank of cylinders 92. The cooling system is mechanized with individual cylinder coolant flow passages 80, 86 and a flow control valve 84 that is operably connected to the controller 10. The flow control valve 84 is synchronized to the cylinder deactivation system such that flow of coolant fluid is directed from individual cylinder coolant flow passages that are adjacent to non-deactivated cylinders. In this embodiment, when cylinders from the first bank 90 of the engine 5 are deactivated, the flow control valve 84 is closed, cutting off flow of coolant fluid from the first bank 90. Flow of coolant fluid to the passenger-compartment heating element 66 comprises only coolant fluid which has flowed past the non-deactivated cylinders in the second bank of cylinders 92. The effective volume of the cooling system is also reduced when the cylinder deactivation system is enabled, because the cooling system effectively excludes the coolant passages around the deactivated cylinders as well as the coolant fluid contained therein. The passenger-compartment heating element 66 receives flow of coolant fluid that has flowed by active cylinders in the second bank of cylinders 92. When the effective volume of the cooling system is reduced, the heat-carrying capacity is reduced, thus decreasing the amount of time needed to increase temperature of the coolant fluid that is being used by the engine 5. The reduced volume of coolant fluid, coupled with the increase in combustion temperatures referenced in FIG. 2B, means that the effective heat transferred from the engine into the coolant fluid and hence into the passenger compartment heating element 66 is greatly increased, compared to a conventional system. The amount of increase in heat transfer is dependent upon the design of the specific engine and cooling system, the vehicle 1, and the operating conditions.

Although this is described as a compression-ignition engine with a specific cylinder deactivation system, cooling system and passenger compartment heating element for a vehicle, it is also understood that alternate embodiments of this invention may be envisioned. The invention also includes other internal combustion engines, including spark-ignition engines, direct-injection spark-ignition engines, and homogeneous-charge, compression-ignition engines. The invention also includes alternative embodiments of input and output devices that are operably attached to the engine controller to control operation of the engine. The invention also includes all applications of internal combustion engines, apart from vehicle applications, wherein waste heat is used, including stationary engines with accompanying cooling systems.

The invention also encompasses other methods of cylinder deactivation different from the method of disabling each intake and exhaust valve and each fuel injector for each cylinder that is disabled. For example, these methods may include deactivating only the fuel injector, or deactivating only one valve and the fuel injector. The method also encompasses other methods of delivering fuel to the combustion chamber. These methods also encompass other valve deactivation schemes, in addition to using the locking pin mechanism described in the embodiment. The invention encompasses other valve opening schemes, for example systems which use electrically-actuated solenoids to open and close valves. The invention also includes alternative methods and apparatus to intake or exhaust air into the combustion chamber, including systems that do not use camshafts or valves. The invention also encompasses systems that are able to deactivate a different number of cylinders other than half the cylinders, as described in the embodiment. For example, a system may be operable to deactivate only two of eight cylinders in an engine, or two of six cylinders in an engine. The invention also encompasses all combinations of selecting cylinders for deactivation, including deactivating all cylinders on a bank of an engine, or alternating cylinders, or opposite cylinders. The invention also encompasses all methods of transferring rejected heat from the engine to the passenger compartment, including air-to-air heat exchangers, or fluid-to-air heat exchangers. The invention has been described with specific reference to the preferred embodiments and modifications thereto. Further modifications and alterations may occur to others upon reading and understanding the specification. It is intended to include all such modifications and alterations insofar as they come within the scope of the invention.

What is claimed is:

1. A method for improving heating of a passenger compartment of a vehicle with a multi-cylinder engine, comprising:

providing said engine with a cooling system containing coolant fluid that is thermally connected to the passenger compartment of the vehicle;

monitoring a temperature of the coolant fluid of the engine;

determining a desired operating point of the engine; and deactivating at least one cylinder based upon the temperature of the coolant fluid and the desired operating point of the engine;

wherein providing said engine with the cooling system containing coolant fluid that is thermally connected to the passenger compartment of the vehicle further comprises reducing heat capacity of the cooling system containing coolant fluid by separating flow of coolant fluid that flows predominately past non-deactivated cylinders such that only the coolant fluid that flows predominately past non-deactivated cylinders is thermally connected to the passenger compartment of the vehicle.

2. The method of claim 1, further comprising increasing the amount of fuel delivered to each of the non-deactivated cylinders by an amount sufficient to maintain the desired operating point.

3. The method of claim 2, wherein determining the desired operating point of the engine comprises monitoring engine load and determining operator demand for power.

4. The method of claim 1, wherein deactivating at least one cylinder comprises: decoupling an opening mechanism of each intake valve of the at least one cylinder;

decoupling an opening mechanism of each exhaust valve of the at least one cylinder; and, disabling fuel delivery to the at least one cylinder.

5. The method of claim 1, wherein deactivating at least one cylinder based upon the temperature of the coolant fluid comprises deactivating at least one cylinder based upon a difference between the monitored temperature of the coolant fluid and a predetermined temperature of the coolant fluid.

6. The method of claim 1, wherein the multi-cylinder engine operates primarily at an air/fuel ratio that is lean of stoichiometry.

7. A system to improve passenger compartment heating of a vehicle with a multi-cylinder engine, comprising:

said engine including a cooling system containing coolant fluid and a cylinder deactivation system;

a controller operably connected to the cylinder deactivation system and a device to monitor temperature of the coolant fluid; and, a heating element for the passenger compartment which is thermally connected to the cooling system containing the coolant fluid;

wherein the controller is operable to determine a desired operating point of the engine, and deactivate at least one cylinder using the cylinder deactivation system based upon the temperature of the coolant fluid and the desired operating point of the engine;

such that the engine is operable to heat the heating element for the passenger compartment by heating the coolant fluid;

wherein the engine cooling system is mechanized with flow passages operable to contain coolant fluid flowing past individual cylinders, wherein the cooling system separates flow of the coolant fluid such that only the coolant fluid that flows predominately past non-deactivated cylinders when the controller has deactivated the at least one cylinder will flow to the heating element for heating the passenger compartment.

8. The system of claim 7, wherein the cylinder deactivation system comprises:

a locking pin mechanism operable to disable a valve opening mechanism of an intake valve of at least one cylinder;

a locking pin mechanism operable to disable a valve opening mechanism of an exhaust valve of the at least one cylinder; and, a fuel injector for delivering fuel to the at least one cylinder.

9. The system of claim 7 wherein the multicylinder engine operates primarily at an air/fuel ratio that is lean of stoichiometry.

* * * * *